United States Patent
Janarthanam et al.

(10) Patent No.: US 11,239,506 B2
(45) Date of Patent: Feb. 1, 2022

(54) THERMAL EVENT DETECTION FOR BATTERY PACKS

(71) Applicant: Ford Global Technologies, LLC, Dearborn, MI (US)

(72) Inventors: Suriyaprakash Ayyangar Janarthanam, Canton, MI (US); Kanchana Perumalla, Troy, MI (US); Mohammadreza Eftekhari, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 146 days.

(21) Appl. No.: 16/739,306

(22) Filed: Jan. 10, 2020

(65) Prior Publication Data

US 2021/0218078 A1 Jul. 15, 2021

(51) Int. Cl.
*H01M 10/48* (2006.01)
*B60L 3/00* (2019.01)
*B60L 50/64* (2019.01)
*B60L 58/27* (2019.01)
*B60L 58/26* (2019.01)

(52) U.S. Cl.
CPC ......... *H01M 10/486* (2013.01); *B60L 3/0046* (2013.01); *B60L 50/64* (2019.02); *B60L 58/26* (2019.02); *B60L 58/27* (2019.02)

(58) Field of Classification Search
CPC .... H01M 10/486; B60L 50/64; B60L 3/0046; B60L 58/26; B60L 58/27
USPC ........................................................ 320/150
See application file for complete search history.

(56) References Cited

U.S. PATENT DOCUMENTS

| | | | |
|---|---|---|---|
| 8,059,007 B2* | 11/2011 | Hermann | H01M 10/486 340/636.11 |
| 8,313,850 B1* | 11/2012 | LePort | H01M 10/42 429/50 |
| 8,597,825 B2* | 12/2013 | Buck | H01M 10/647 429/177 |
| 8,983,733 B2 | 3/2015 | Knight-Newbury et al. | |
| 9,156,356 B2* | 10/2015 | Rini | B60L 58/22 |
| 10,141,550 B2* | 11/2018 | Robert | B60K 6/52 |
| 10,164,450 B2* | 12/2018 | Masias | B60L 53/62 |
| 10,374,201 B2 | 8/2019 | Bianchi et al. | |
| 2010/0136391 A1* | 6/2010 | Prilutsky | H01M 10/6567 429/62 |
| 2010/0251692 A1* | 10/2010 | Kinde, Sr. | F02K 7/16 60/226.1 |

(Continued)

FOREIGN PATENT DOCUMENTS

CN 105489806 A 4/2016
CN 107871836 A 4/2018

(Continued)

*Primary Examiner* — M Baye Diao
(74) *Attorney, Agent, or Firm* — David B. Kelley; Carlson, Gaskey & Olds, P.C.

(57) ABSTRACT

This disclosure relates to thermal event detection for battery packs of electrified vehicles. An example electrified vehicle includes a battery assembly including an enclosure assembly surrounding at least one battery array, and a controller configured to receive information associated with the battery assembly and detect a thermal event based on the information. The controller is configured to issue a plurality of corrective action commands following detection of the thermal event.

18 Claims, 4 Drawing Sheets

(56) References Cited

U.S. PATENT DOCUMENTS

| | | | |
|---|---|---|---|
| 2018/0208074 A1 | 7/2018 | Lee et al. | |
| 2019/0140227 A1* | 5/2019 | Paramasivam | H01M 10/613 |
| 2020/0058908 A1* | 2/2020 | Zheng | B60K 1/04 |

FOREIGN PATENT DOCUMENTS

| | | | | |
|---|---|---|---|---|
| CN | 108736100 A | | 11/2018 | |
| CN | 110265600 A | * | 9/2019 | ............ F28F 17/005 |
| CN | 209658280 U | * | 11/2019 | |
| DE | 102013200730 A1 | | 7/2014 | |
| EP | 3772428 A1 | * | 2/2021 | ............ B60L 3/0046 |
| EP | 3798040 A1 | * | 3/2021 | ............. B60L 58/26 |
| FR | 2961705 A1 | | 12/2011 | |
| JP | 2009193882 A | * | 8/2009 | |
| JP | 2009289668 A | * | 12/2009 | |
| WO | WO-2005020170 A2 | * | 3/2005 | ......... B60H 1/00792 |
| WO | 2010083413 A2 | | 7/2010 | |

\* cited by examiner

THERMAL EVENT DETECTION FOR BATTERY PACKS

TECHNICAL FIELD

This disclosure relates to thermal event detection for battery packs of electrified vehicles.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

A high voltage battery pack typically powers the electric machines and other electrical loads of the electrified vehicle. The battery pack includes a plurality of battery cells and various other battery internal components that support electric propulsion of electrified vehicles.

SUMMARY

An electrified vehicle according to an exemplary aspect of the present disclosure includes, among other things, a battery assembly including an enclosure assembly surrounding at least one battery array, and a controller configured to receive information associated with the battery assembly and detect a thermal event based on the information. The controller is configured to issue a plurality of corrective action commands following detection of the thermal event.

In a further non-limiting embodiment of the foregoing electrified vehicle, the electrified vehicle includes a sensor electrically coupled to the controller and configured to generate a signal indicative of whether a predetermined type of gas is present within the enclosure assembly. The controller is configured to detect the thermal event based on the signal.

In a further non-limiting embodiment of any of the foregoing electrified vehicles, the predetermined type of gas is carbon monoxide (CO).

In a further non-limiting embodiment of any of the foregoing electrified vehicles, the sensor is within the enclosure assembly.

In a further non-limiting embodiment of any of the foregoing electrified vehicles, the electrified vehicle includes a vent tube fluidly coupling the interior of the enclosure assembly to an environment outside the electrified vehicle.

In a further non-limiting embodiment of any of the foregoing electrified vehicles, the vent tube includes a one-way valve preventing flow from the environment outside the electrified vehicle into the interior of the enclosure assembly.

In a further non-limiting embodiment of any of the foregoing electrified vehicles, the information includes at least one of a temperature of battery cells within the at least one battery array, a voltage output of the battery cells, and charging or discharging currents of the battery cells.

In a further non-limiting embodiment of any of the foregoing electrified vehicles, the enclosure assembly includes a tray and a cover, and an interface between the tray and cover is configured to prevent fluid from exiting an interior of the enclosure assembly via the interface.

In a further non-limiting embodiment of any of the foregoing electrified vehicles, the cover includes a lip outward of and beneath a rim of the tray.

In a further non-limiting embodiment of any of the foregoing electrified vehicles, the cover includes a ledge vertically above the lip, and a seal is between the ledge and the rim.

In a further non-limiting embodiment of any of the foregoing electrified vehicles, the ledge and the rim are stepped and each include a first stepped surface vertically beneath a second stepped surface, a first seal is vertically between the first stepped surfaces of the ledge and the rim, and a second seal is vertically between the second stepped surfaces of the ledge and rim.

In a further non-limiting embodiment of any of the foregoing electrified vehicles, the plurality of corrective action commands include at least one of instructing a bag within the enclosure assembly to release nitrogen, instructing the electrified vehicle to gradually slow to a stop, instructing the electrified vehicle to shut down and to prevent restart after shut down, instructing a display of the electrified vehicle to display a prompt indicating that a thermal event has been detected, and instructing a speaker of the electrified vehicle to output an audible prompt indicating that a thermal event has been detected.

In a further non-limiting embodiment of any of the foregoing electrified vehicles, the plurality of corrective action commands include each of instructing a bag within the enclosure assembly to release nitrogen, instructing the electrified vehicle to gradually slow to a stop, instructing the electrified vehicle to shut down and to prevent restart after shut down, instructing a display of the electrified vehicle to display a prompt indicating that a thermal event has been detected, and instructing a speaker of the electrified vehicle to output an audible prompt indicating that a thermal event has been detected.

In a further non-limiting embodiment of any of the foregoing electrified vehicles, the controller includes one or more of a battery control module, dash board control module, and a vehicle control module.

A method according to an exemplary aspect of the present disclosure includes, among other things, detecting a thermal event associated with a battery assembly of an electrified vehicle based on information associated with the battery assembly, and issuing a plurality of corrective action commands following detection of the thermal event.

In a further non-limiting embodiment of the foregoing method, the information includes a signal indicating a presence of carbon monoxide within an interior of an enclosure assembly of the battery assembly.

In a further non-limiting embodiment of any of the foregoing methods, the information includes at least one of a temperature of battery cells within the battery assembly, a voltage output of the battery cells, and charging or discharging currents of the battery cells.

In a further non-limiting embodiment of any of the foregoing methods, the method includes venting fluid within the interior of an enclosure assembly of the battery assembly to an environment outside the electrified vehicle via a vent tube.

In a further non-limiting embodiment of any of the foregoing methods, the plurality of corrective action commands include at least one of instructing a bag within an enclosure assembly of the battery assembly to release nitrogen, instructing the electrified vehicle to gradually slow to a stop, instructing the electrified vehicle to shut down and to prevent restart after shut down, instructing a display of the electrified vehicle to display a prompt indicating that a thermal event has been detected, and instructing a speaker of the electrified vehicle to output an audible prompt indicating that a thermal event has been detected.

In a further non-limiting embodiment of any of the foregoing methods, the detecting and issuing steps are performed by at least one of a battery control module, dash board control module, and a vehicle control module.

BRIEF DESCRIPTION OF THE DRAWINGS

In FIG. 2, a bag of the battery assembly is not inflated.

In FIG. 3, the bag is inflated.

DETAILED DESCRIPTION

This disclosure relates to thermal event detection for battery packs of electrified vehicles. An example electrified vehicle includes a battery assembly including an enclosure assembly surrounding at least one battery array, and a controller configured to receive information associated with the battery assembly and detect a thermal event based on the information. The controller is configured to issue a plurality of corrective action commands following detection of the thermal event. Among other benefits, which will be appreciated from the below description, the disclosed arrangement promptly mitigates a thermal event of the battery assembly and takes additional corrective actions, such as providing various prompts and status indicators to the user.

Figure 1:
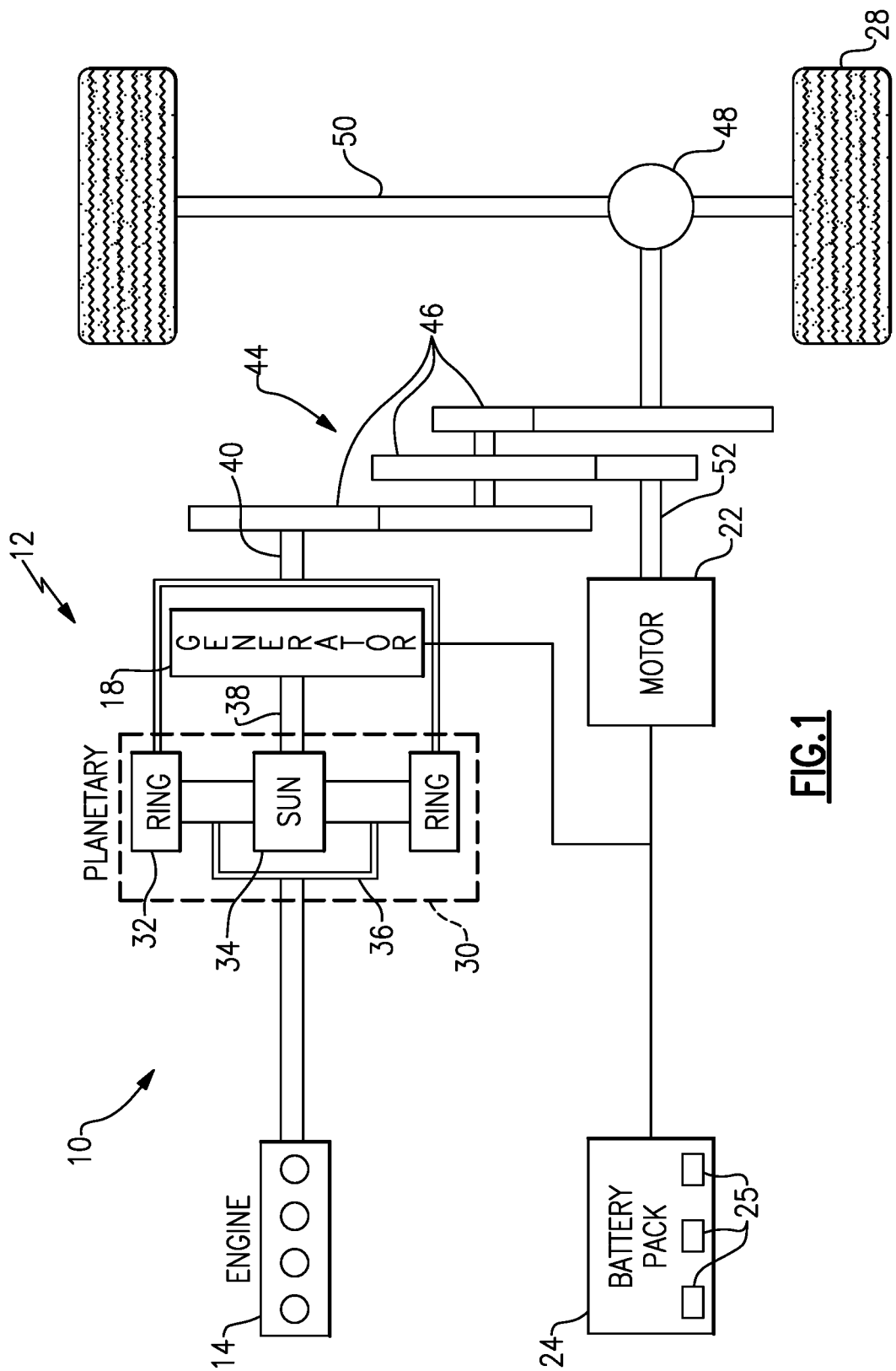
FIG. 1 schematically illustrates an example powertrain of an electrified vehicle.

FIG. 1 schematically illustrates a powertrain 10 for an electrified vehicle 12 ("vehicle 12"). Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

Figure 2:
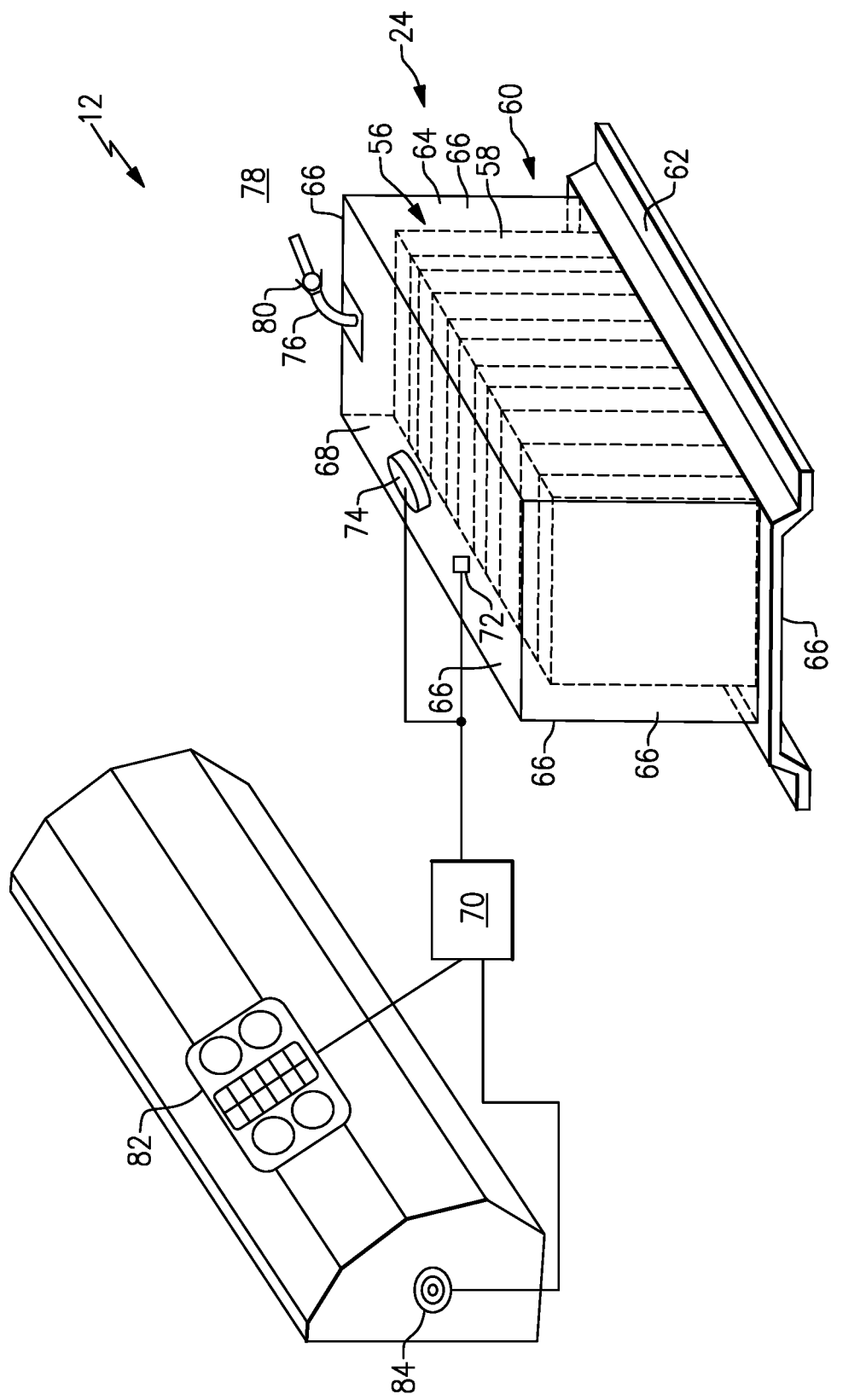
FIG. 2 schematically illustrates an example battery assembly of the electrified vehicle relative to certain other components of the electrified vehicle.

The battery assembly 24 is an exemplary electrified vehicle battery. The battery assembly 24 may be a high voltage traction battery pack that includes a plurality of battery assemblies 25 (i.e., battery arrays or groupings of battery cells) capable of outputting electrical power to operate the motor 22, the generator 18, and/or other electrical loads of the vehicle 12. An example battery assembly 25 is shown in FIG. 2, and includes a single battery array with a plurality of battery cells. This disclosure is not limited to battery packs with one battery array and extends to battery packs with one or more battery arrays. Other types of energy storage devices and/or output devices can also be used to electrically power the vehicle 12.

In one non-limiting embodiment, the vehicle 12 has two basic operating modes. The vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The vehicle 12 may additionally operate in a Hybrid (HEV) mode in which the engine 14 and the motor 22 are both used for vehicle propulsion. The HEV mode is an example of a charge sustaining mode of operation for the vehicle 12. During the HEV mode, the vehicle 12 may reduce the motor 22 propulsion usage in order to maintain the state of charge of the battery assembly 24 at a constant or approximately constant level by increasing the engine 14 propulsion usage. The vehicle 12 may be operated in other operating modes in addition to the EV and HEV modes within the scope of this disclosure.

FIG. 2 illustrates additional detail of the battery assembly 24 relative to certain other components of the vehicle 12. In FIG. 2, the battery assembly 24 includes one battery array 56 configured to supply electrical power to various vehicle components. The battery array 56 includes a plurality of battery cells 58 that may be stacked side-by-side along a span length (i.e., the largest dimension) of the battery array 56. Although not shown in the schematic depiction of FIG. 2, the battery cells 58 are electrically connected to one another using busbar assemblies. In one embodiment, the battery cells 58 are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

An enclosure assembly 60 surrounds the battery array 56. The enclosure assembly 60 is shown as a see-through structure in FIG. 2, but typically the enclosure assembly 60 is opaque. In one non-limiting embodiment, the enclosure assembly 60 includes a tray 62 and a cover 64. The tray 62 and cover 64 establish a plurality of walls 66 that surround an interior 68 (i.e., area inside the walls 66) of the enclosure assembly 60, which houses the battery array 56 and any other components of the battery assembly 2. The enclosure assembly 60 may take any size, shape or configuration, and is not limited to the specific configuration of FIG. 2.

The enclosure assembly 60 may be made of one or more distinct parts, such as the tray 62 and the cover 64, which are connected together. In order to provide an air and water-tight seal, a gasket or seal may fill the space at an interface between the mating surfaces of the parts of the enclosure assembly 60. Example seal and interface arrangements will be discussed below relative to FIGS. 4-6.

The battery cells 58 and internal components of the battery assembly 24 can experience thermal runaway during certain battery thermal events (e.g., overcharging, overheating, etc.). Further, in some conditions, the battery cells 58 may vent gases into the interior 68 of the enclosure assembly 60. The vent gases may be caused by an applied force or a thermal event, and can either cause or exacerbate an existing thermal event. This disclosure monitors for conditions indicative of thermal events and takes a plurality of corrective actions in response to a detected thermal event. In doing so, this disclosure mitigates and ultimately eliminates such events. Further, this disclosure provides increased user awareness of such events and further provides the user with the status of the vehicle 12 as the vehicle 12 takes various corrective actions.

The vehicle 12 includes a controller 70 configured to receive information associated with the battery assembly 24 and detect a thermal event based on the information. Further, the controller 70 is configured to issue a plurality of corrective action commands following detection of the thermal event.

The controller 70 is configured to receive information via wired or wireless connections from various components of the vehicle 12 and is configured to interpret that information and issue commands to the components of the vehicle 12 based on that information. The controller 70 is shown schematically in FIG. 2. It should be understood that the controller 70 may include hardware and software, and could be part of an overall vehicle control module, such as a body control module (BCM), dash board control module, or vehicle system controller (VSC), or could alternatively be a stand-alone controller separate from the BCM or VSC. In an example embodiment, some operations of the controller 70 described herein may be performed by separate control modules, such as the BCM, dash board control module, and vehicle control module. In this regard, the controller 70 may include one or more of a BCM, dash board control module, and a vehicle control module.

Further, the controller 70 may be programmed with executable instructions for interfacing with and operating the various components of the vehicle 12. The controller 70 additionally includes a processing unit and non-transitory memory for executing the various control strategies and modes of the vehicle system.

The controller 70, in this example, is electrically coupled to a sensor 72 arranged within the interior 68 and configured to generate a signal indicative of whether a predetermined type of gas is present within the enclosure assembly 60. In one example, the sensor 72 is a carbon monoxide (CO) sensor configured to generate a signal which, when interpreted by the controller 70, is indicative of a level of carbon monoxide (CO) within the interior 68. Carbon monoxide (CO) is a known constituent of battery cell vent gas, however this disclosure may monitor for other types of gases.

The controller 70 is configured to detect a thermal event when the signal from the sensor 72 indicates the presence of carbon monoxide (CO) within the enclosure assembly 60. The controller 70 may detect the thermal event when any carbon monoxide (CO) is detected, or, in another example, when the level of carbon monoxide (CO) exceeds a predetermined threshold. Alternatively, the sensor 72 may be a "smart" sensor configured to send a command to the controller 70 indicating the level of carbon monoxide (CO) in the interior 68. In this example, the controller 70 does not need to interpret the signal of the sensor 72, but rather is responsive to commands from the sensor 72. This disclosure is not limited to any particular type of sensor.

In addition to monitoring for vent gases using the sensor 72, the controller 70 may alternatively or additionally consider other information that may be indicative of a thermal event. Such information includes a temperature of battery cells 58, a voltage output of the battery cells 58, and/or charging or discharging currents of the battery cells 58. If such values exceed a predetermined threshold or follow a pattern known to correspond to thermal events, the controller 70 will detect a thermal event. While some example information is listed above, the controller 70 may alternatively or additionally consider other information that may be indicative of a thermal event.

Following detection of a thermal event, the controller 70 is configured to issue a plurality of corrective action commands. In this disclosure, such commands are instructions sent by the controller 70 to other devices of the vehicle 12, which then execute the instructions. The corrective action commands are instructions which cause the other devices of the vehicle 12 to either mitigate the thermal event or make users aware of the thermal event. Example corrective action commands will now be described below.

A first example corrective action command includes instructing a bag 74 arranged within the interior 68 to generate and release nitrogen (Ni) within the interior 68. In response to a corresponding instruction from the controller 70, the bag 74 is configured to self-inflate. In FIG. 2 the bag 74 is not inflated. The bag 74 is inflated in FIG. 3. The bag 74 contains ingredients which are selectively combinable to release nitrogen (Ni). The bag 74 is expandable and is permeable such that nitrogen (Ni) is released into the interior 68 in response to the corresponding instruction from the controller 70. Nitrogen (Ni) starves the interior 68 of oxygen ($O_2$) and thus mitigates and ultimately extinguishes a thermal event.

Figure 3:
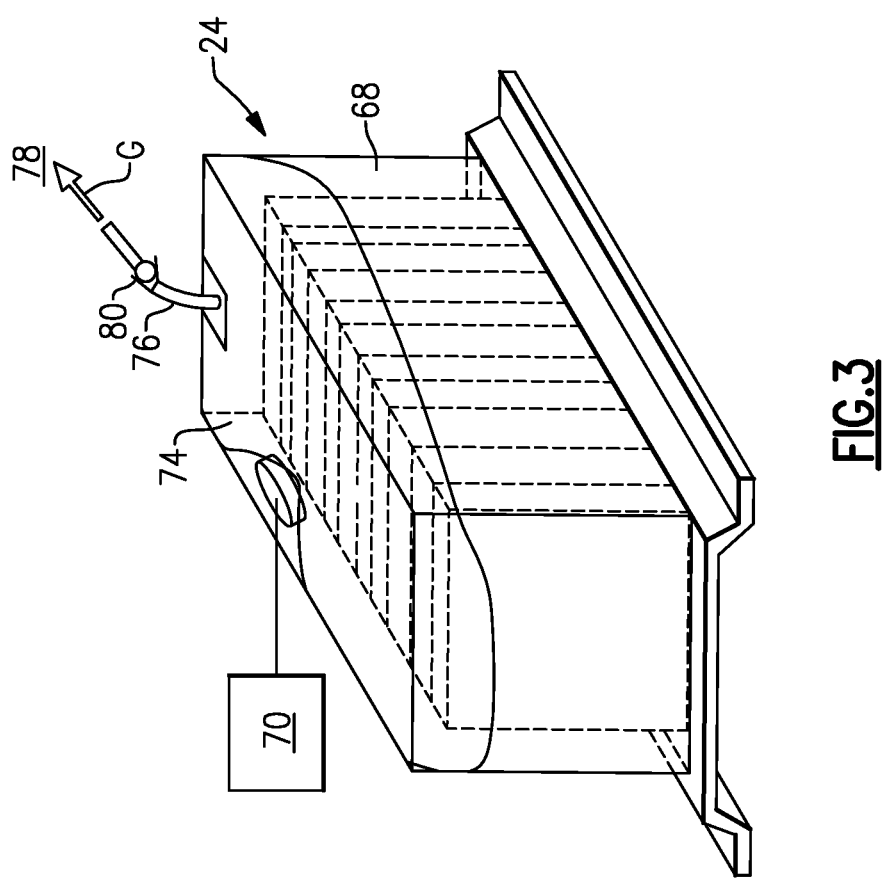
FIG. 3 schematically illustrates the example battery assembly of FIG. 2.

In this example, a vent tube 76 fluidly couples the interior 68 of the enclosure assembly 60 to an environment 78 outside the vehicle 12. Thus, vent gases escape the vehicle 12 via the vent tube 76. Further, oxygen ($O_2$) is forced out the vent tube 76 upon the release of nitrogen (Ni) from the bag 74. In FIG. 3, vent gases and oxygen ($O_2$) are flowing out the vent tube 76 as represented by reference character G.

The vent tube 76 includes a one-way valve 80 in this example. The one-way valve 80 prevents gases from flowing from the environment 78 back into the interior 68. In an example, the sensor 72 is adjacent the vent tube 76, although the sensor 72 may be provided in other locations. Further, there could be a plurality of the sensors 72 arranged at different locations in the interior 68.

If a thermal event is detected while the vehicle 12 is in motion, a second example corrective action command includes instructing the vehicle 12 to gradually slow to a stop. Once the vehicle 12 is stopped or, alternatively if the vehicle 12 was already stopped, a third example corrective action command includes instructing the vehicle 12 to shut down and to prevent restart after shut down. In this disclosure, shutting down the vehicle 12 includes, within a predefined time limit, shutting off the battery assembly 24. In combination with any or all of the above corrective action commands, the controller 70 may additionally issue one or more audio and/or visual prompts to the user.

In particular, a fourth example corrective action command includes instructing a display 82 of the vehicle 12 to display a message or prompt indicating that a thermal event has been detected. In this example, the display 82 in FIG. 2 is a human-machine interface, such as a touchscreen, and may be located on or adjacent a dashboard of the vehicle 12. The display 82 may alternatively or additionally be a mobile device, such as a smart phone or smart watch, of the user. The message or prompt may indicate that a thermal event has been detected, and/or provide a status of the vehicle, such as that the vehicle 12 is automatically slowing to a stop and/or that the vehicle 12 cannot be restarted.

A fifth example corrective action command includes instructing a speaker 84 of the vehicle 12 to output an audible prompt, such as an alarm, tone, and/or spoken words, indicating that a thermal event has been detected and/or providing the status of the vehicle 12, such as by repeatedly speaking the words "vehicle is slowing to a stop" or "thermal event detected" the like.

Each of the above-discussed corrective action commands may be done simultaneously or in a particular sequence. As one example, after detecting a thermal event, the controller 70 is configured to send a command triggering the release of nitrogen (Ni) from the bag 74 and to simultaneously issue commands gradually slowing the vehicle 12 and providing audible and visual prompts. Once the vehicle 12 has stopped, the controller 70 instructs the vehicle 12 to shut down and prevents the vehicle 12 from being restarted until the vehicle 12 can be serviced, in one example. While particular corrective action commands have been described above, this disclosure extends to other types of corrective action commands. Further, this disclosure is not limited to any particular order or sequence of executing such commands.

Another aspect of this disclosure relates to an interface between the tray 62 and cover 64. The interface is configured to prevent fluid, such as vent gases, from exiting the interior 68 via the interface. Rather, the fluid exits via the vent tube 76 and flows to the outside environment 78. Three example interfaces 86, 86', 86" are shown across FIGS. 4-6.

Figure 4:
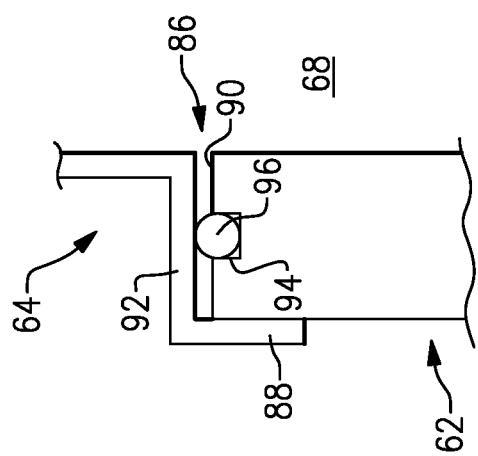
FIG. 4 is a cross-sectional view of a first example interface between a tray and a cover of an enclosure assembly of the battery assembly.

FIG. 4 illustrates an interface 86 between a side wall of the tray 62 and a side wall of the cover 64. The interior 68 is shown for reference. While only a section of the tray 62 and cover 64 are shown, it should be understood that the interface 86 may be present around substantially the entire perimeter of the enclosure assembly 60. Further, while shown with a side wall, the tray 62 may be substantially flat and not include a side wall. In that case, the interface 86 may still be present between the substantially flat tray 62 and the cover 64. Further, while not shown in FIGS. 4-6, the tray 62 and cover 64 may be attached using fasteners, such as bolts.

In FIG. 4, the cover 64 includes a lip 88 outward of and beneath a rim 90 of the tray 62. The arrangement of the lip 88 serves to contain some contents of the enclosure assembly 60, such as those that cannot make 90-degree turns. The rim 90 in this example is an uppermost surface of the tray 62. The cover 64 further includes a ledge 92 vertically upward (relative to the orientation in FIG. 4) of the lip 88 and substantially vertically overlapping the rim 90. In FIG. 4, the rim 90 includes a channel 94 receiving a seal 96. The seal 96 exhibits a substantially circular cross-section and directly contacts the channel 94 and the ledge 92. The seal 96 is made of a material that is capable of providing an air and water-tight seal, such as rubber. Thus, the seal 96 prevents fluid from escaping via the interface 86.

Figure 5:
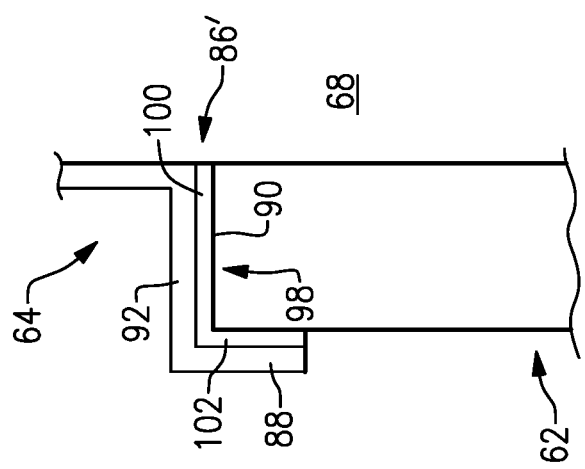
FIG. 5 is a cross-sectional view of a second example interface between the tray and the cover.

FIG. 5 illustrates another example interface 86' similar to the interface 86 of FIG. 4 except that the rim 90 does not include the channel 94 and with a different seal. In FIG. 5, a seal 98 is substantially L-shaped and arranged such that a first leg 100 of the seal 98 is between the rim 90 and the ledge 92 and a second leg 102, which extends substantially normal to the first leg 100, is between an inner surface of the lip 88 and an outer surface of the tray 62.

Figure 6:
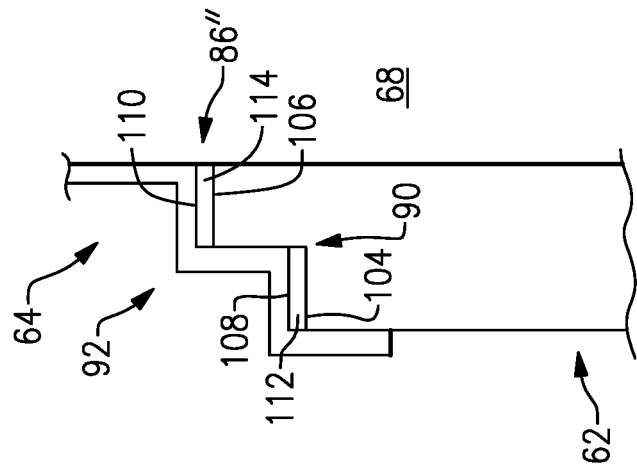
FIG. 6 is a cross-sectional view of a third example interface between the tray and the cover.

FIG. 6 illustrates yet another example interface 86". In FIG. 6, the rim 90 and the ledge 92 are stepped. For instance, the rim 90 includes a first stepped surface 104 vertically beneath a second stepped surface 106, and the ledge 92 also includes a corresponding first stepped surface 108 vertically beneath a second stepped surface 110. Further, a first seal 112 is vertically between and directly contacts the first stepped surfaces 104, 108. Likewise, a second seal 114 is vertically between and directly contacts the second stepped surfaces 106, 110. While three example interface configurations have been illustrated in FIGS. 4-6, this disclosure extends to other configurations.

It should be understood that terms such as "about," "substantially," and "generally" are not intended to be boundaryless terms, and should be interpreted consistent with the way one skilled in the art would interpret those terms. It should also be understood that directional terms such as "vertical," "forward," "rear," "side," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   a battery assembly including an enclosure assembly surrounding at least one battery array; and
   a controller configured to receive information associated with the battery assembly and detect a thermal event based on the information, and wherein the controller is configured to issue a plurality of corrective action commands following detection of the thermal event,
   wherein the enclosure assembly includes a tray and a cover,
   wherein an interface between the tray and cover is configured to prevent fluid from exiting an interior of the enclosure assembly via the interface, and
   wherein the cover includes a lip outward of and beneath a rim of the tray.

2. The electrified vehicle as recited in claim 1, further comprising:
   a sensor electrically coupled to the controller and configured to generate a signal indicative of whether a predetermined type of gas is present within the enclosure assembly, and
   wherein the controller is configured to detect the thermal event based on the signal.

3. The electrified vehicle as recited in claim 2, wherein the predetermined type of gas is carbon monoxide (CO).

4. The electrified vehicle as recited in claim 2, wherein the sensor is within the enclosure assembly.

5. The electrified vehicle as recited in claim 2, further comprising a vent tube fluidly coupling the interior of the enclosure assembly to an environment outside the electrified vehicle.

6. The electrified vehicle as recited in claim 5, wherein the vent tube includes a one-way valve preventing flow from the environment outside the electrified vehicle into the interior of the enclosure assembly.

7. The electrified vehicle as recited in claim 1, wherein the information includes at least one of a temperature of battery cells within the at least one battery array, a voltage output of the battery cells, and charging or discharging currents of the battery cells.

8. The electrified vehicle as recited in claim 1, wherein:
   the cover includes a ledge vertically above the lip, and
   a seal is between the ledge and the rim.

9. The electrified vehicle as recited in claim 8, wherein:
   the ledge and the rim are stepped and each include a first stepped surface vertically beneath a second stepped surface,
   a first seal is vertically between the first stepped surfaces of the ledge and the rim, and
   a second seal is vertically between the second stepped surfaces of the ledge and rim.

10. The electrified vehicle as recited in claim 1, wherein the plurality of corrective action commands include at least one of instructing a bag within the enclosure assembly to release nitrogen, instructing the electrified vehicle to gradually slow to a stop, instructing the electrified vehicle to shut down and to prevent restart after shut down, instructing a display of the electrified vehicle to display a prompt indicating that a thermal event has been detected, and instructing a speaker of the electrified vehicle to output an audible prompt indicating that a thermal event has been detected.

11. The electrified vehicle as recited in claim 1, wherein the plurality of corrective action commands include each of instructing a bag within the enclosure assembly to release nitrogen, instructing the electrified vehicle to gradually slow to a stop, instructing the electrified vehicle to shut down and to prevent restart after shut down, instructing a display of the electrified vehicle to display a prompt indicating that a thermal event has been detected, and instructing a speaker of the electrified vehicle to output an audible prompt indicating that a thermal event has been detected.

12. The electrified vehicle as recited in claim 1, wherein the controller includes one or more of a battery control module, dash board control module, and a vehicle control module.

13. A method, comprising:
   detecting a thermal event associated with a battery assembly of an electrified vehicle based on information associated with the battery assembly, wherein the battery includes an enclosure assembly surrounding at least one battery array, wherein the enclosure assembly includes a tray and a cover, wherein an interface between the tray and cover is configured to prevent fluid from exiting an interior of the enclosure assembly via the interface, and wherein the cover includes a lip outward of and beneath a rim of the tray; and
   issuing a plurality of corrective action commands following detection of the thermal event.

14. The method as recited in claim 13, wherein the information includes a signal indicating a presence of carbon monoxide within an interior of an enclosure assembly of the battery assembly.

15. The method as recited in claim 13, wherein the information includes at least one of a temperature of battery cells within the battery assembly, a voltage output of the battery cells, and charging or discharging currents of the battery cells.

16. The method as recited in claim 13, further comprising venting fluid within the interior of an enclosure assembly of the battery assembly to an environment outside the electrified vehicle via a vent tube.

17. The method as recited in claim 13, wherein the plurality of corrective action commands include at least one of instructing a bag within an enclosure assembly of the battery assembly to release nitrogen, instructing the electrified vehicle to gradually slow to a stop, instructing the electrified vehicle to shut down and to prevent restart after shut down, instructing a display of the electrified vehicle to display a prompt indicating that a thermal event has been detected, and instructing a speaker of the electrified vehicle to output an audible prompt indicating that a thermal event has been detected.

18. The method as recited in claim 13, wherein the detecting and issuing steps are performed by at least one of a battery control module, dash board control module, and a vehicle control module.

* * * * *